(12) United States Patent
Hwang et al.

(10) Patent No.: US 11,927,683 B2
(45) Date of Patent: Mar. 12, 2024

(54) DEVICE AND METHOD FOR V2X COMMUNICATION

(71) Applicant: LG Electronics Inc., Seoul (KR)

(72) Inventors: Jaeho Hwang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 250 days.

(21) Appl. No.: 17/421,097

(22) PCT Filed: Jan. 10, 2019

(86) PCT No.: PCT/KR2019/000397
§ 371 (c)(1),
(2) Date: Jul. 7, 2021

(87) PCT Pub. No.: WO2020/145437
PCT Pub. Date: Jul. 16, 2020

(65) Prior Publication Data
US 2022/0107382 A1 Apr. 7, 2022

(51) Int. Cl.
*G01S 5/00* (2006.01)
*G01S 5/02* (2010.01)
(Continued)

(52) U.S. Cl.
CPC .......... *G01S 5/0072* (2013.01); *G01S 5/0284* (2013.01); *H04W 4/12* (2013.01); *H04W 4/44* (2018.02)

(58) Field of Classification Search
None
See application file for complete search history.

(56) References Cited

U.S. PATENT DOCUMENTS

2010/0164789 A1 7/2010 Basnayake
2010/0262396 A1* 10/2010 Kircher ............... G01C 22/004
702/96
(Continued)

FOREIGN PATENT DOCUMENTS

EP 3352486 A1 7/2018
KR 10-2018-0043021 A 4/2018
KR 10-2018-0105686 A 9/2018

OTHER PUBLICATIONS

3GPP; Technical Specification Group Services and System Aspects; Study on enhancement of 3GPP Support for 5G V2X Services (Release 16). 3GPP TR 22.886 V16.2.0. Dec. 21, 2018.

*Primary Examiner* — Ernest G Tacsik
(74) *Attorney, Agent, or Firm* — BRYAN CAVE LEIGHTON PAISNER LLP

(57) ABSTRACT

A method for obtaining, by a vehicle, information regarding its own location through V2X communication is disclosed. Specifically, the method for obtaining location information of a vehicle may comprise the steps of: receiving a V2I message including location information of a road side unit (RSU) from the RSU; receiving a V2X message including reception time information related to a time when the V2I message is received from each of a first surrounding vehicle and a second surrounding vehicle; calculating a relative position of the RSU relative to the current vehicle on the basis of the reception time information and the time at which the current vehicle received the V2I message; and acquiring the location of the current vehicle on the basis of the relative location of the RSU and the location information of the RSU.

10 Claims, 13 Drawing Sheets

(51) Int. Cl.
*H04W 4/12* (2009.01)
*H04W 4/44* (2018.01)

(56) References Cited

U.S. PATENT DOCUMENTS

2020/0077238 A1* 3/2020 Alexander .............. H04W 4/40
2021/0274390 A1* 9/2021 Kifle ................. H04W 36/0009

* cited by examiner

[Fig.1]
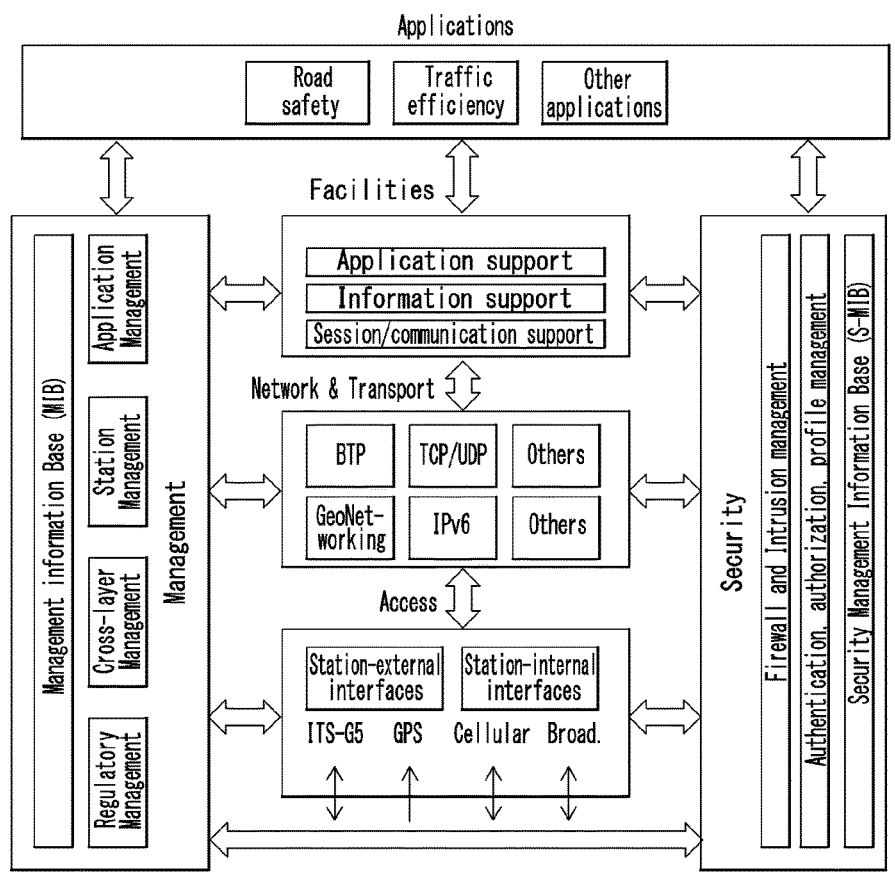

[Fig.2]
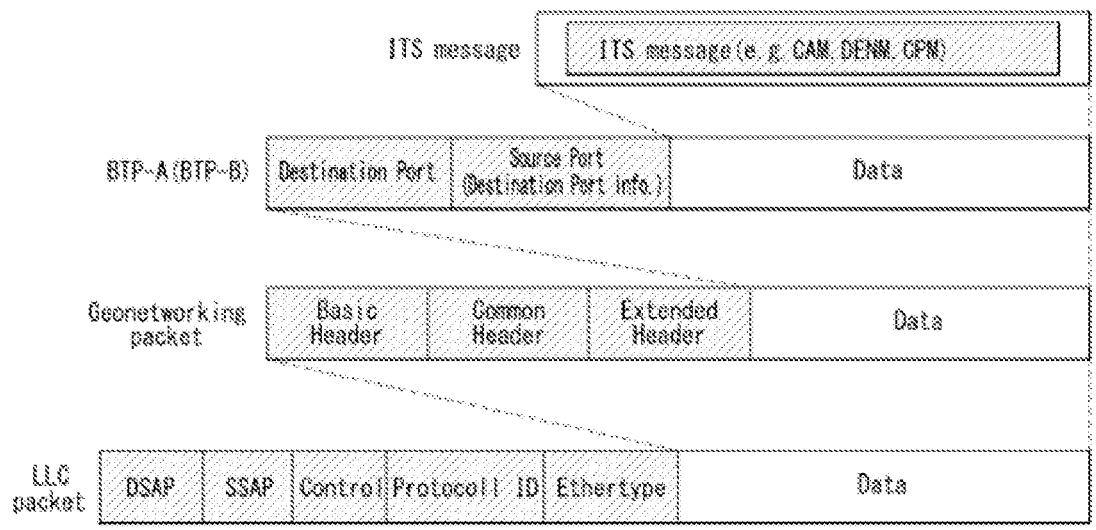
[Fig.3]
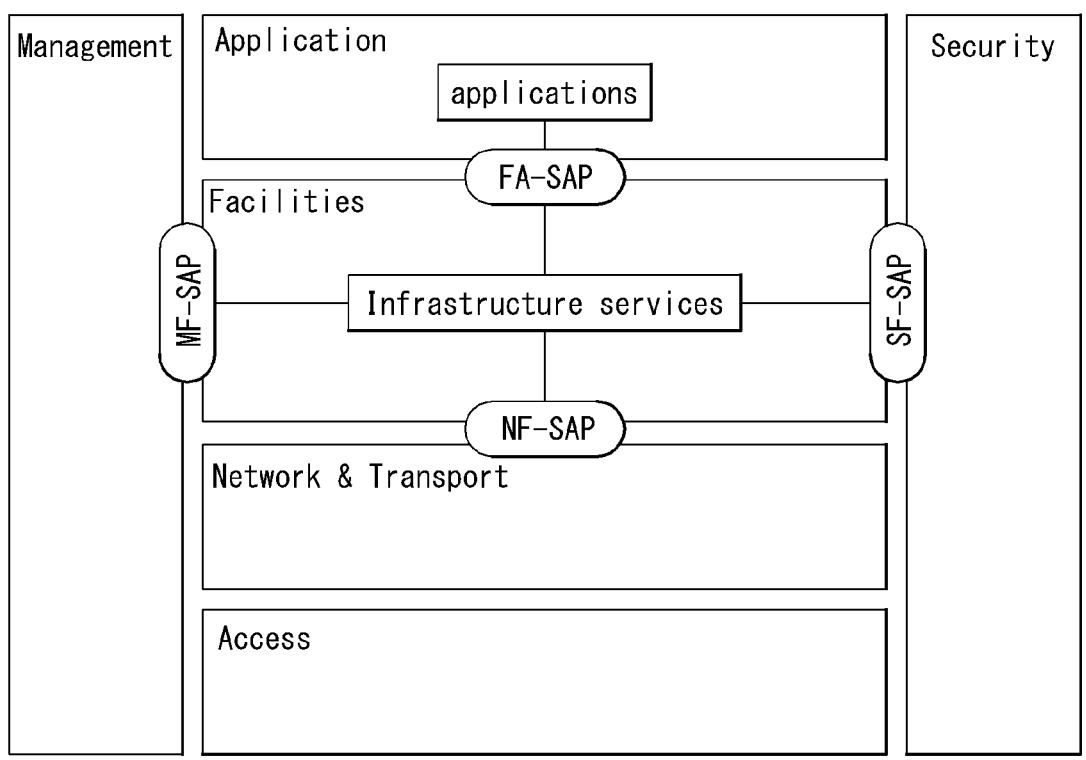

[Fig.4]
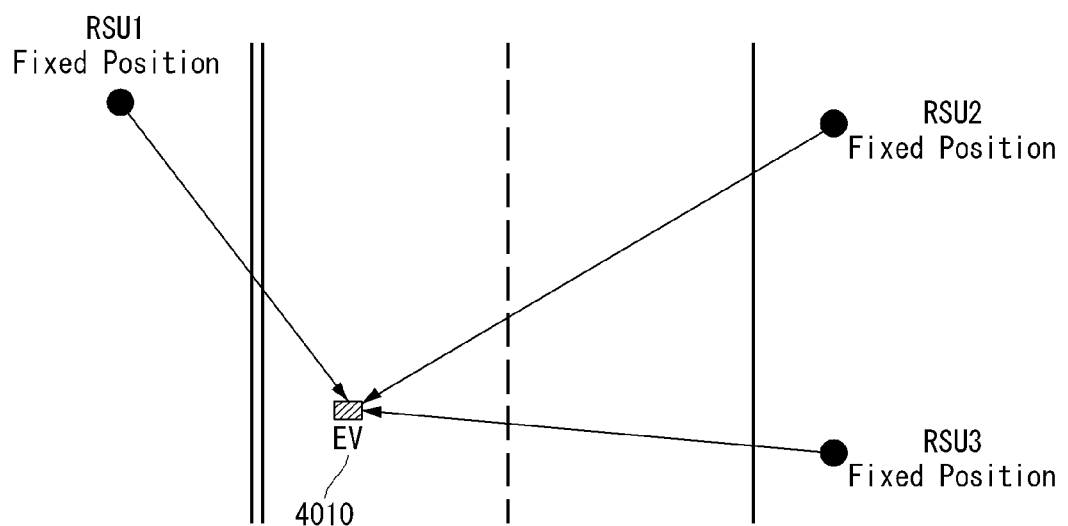
[Fig.5]
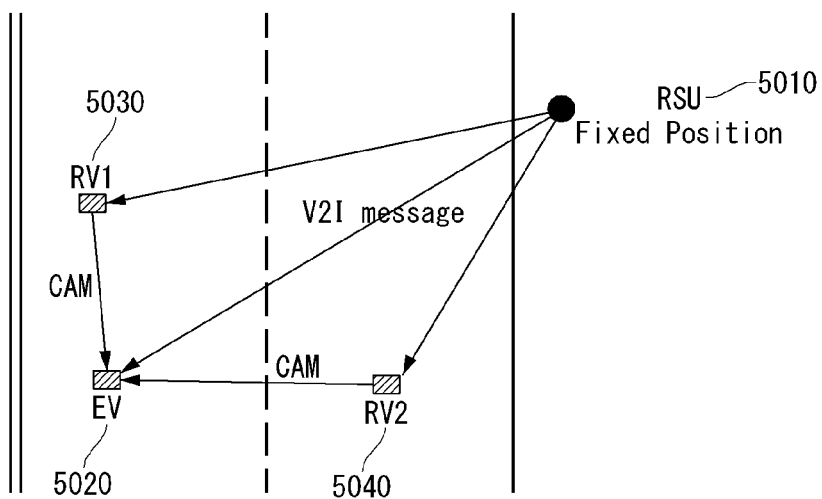

[Fig.6]
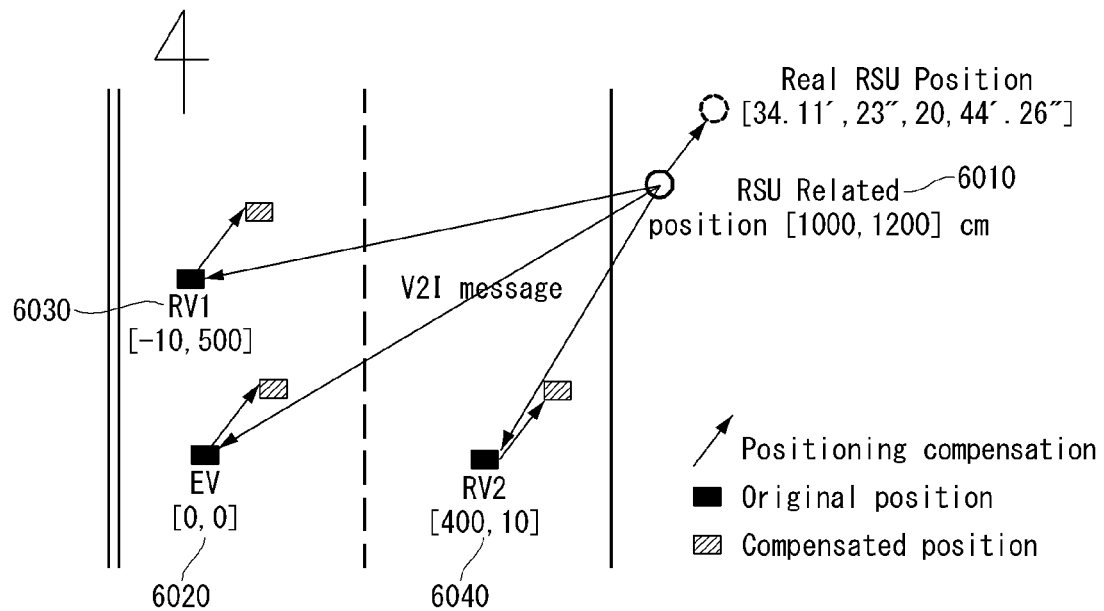
[Fig.7]
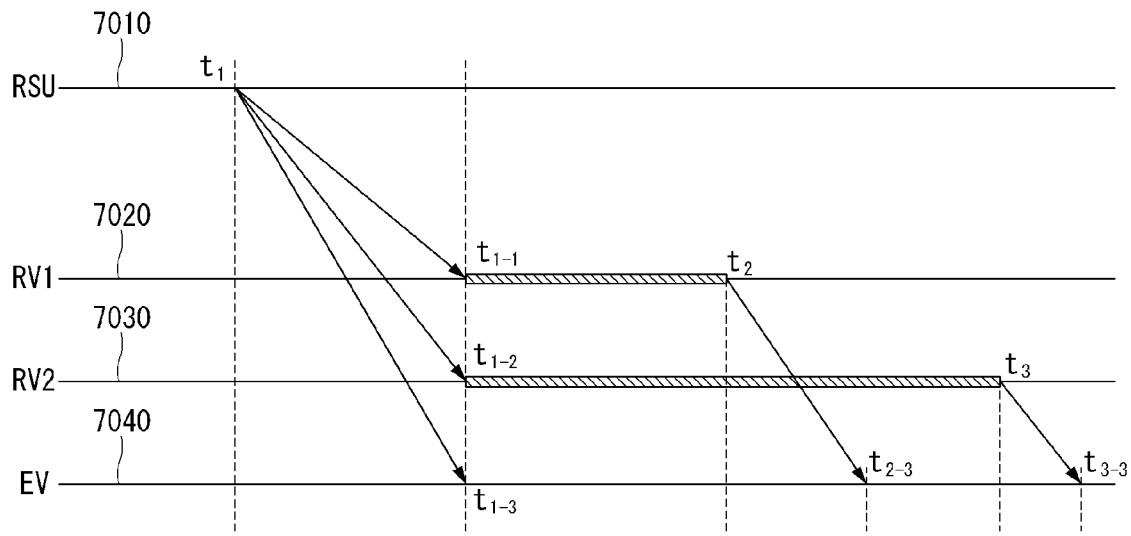

[Fig.8]
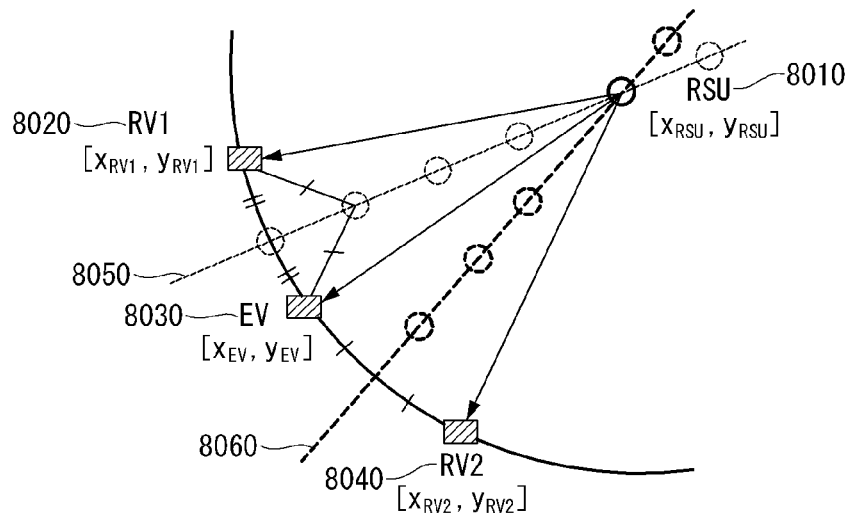
[Fig.9]
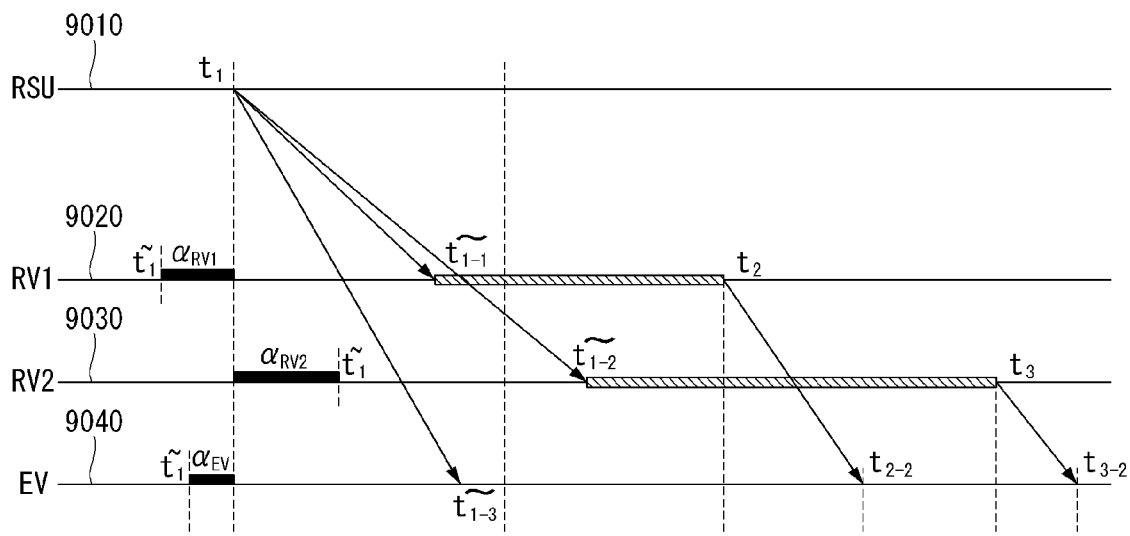

[Fig.10]
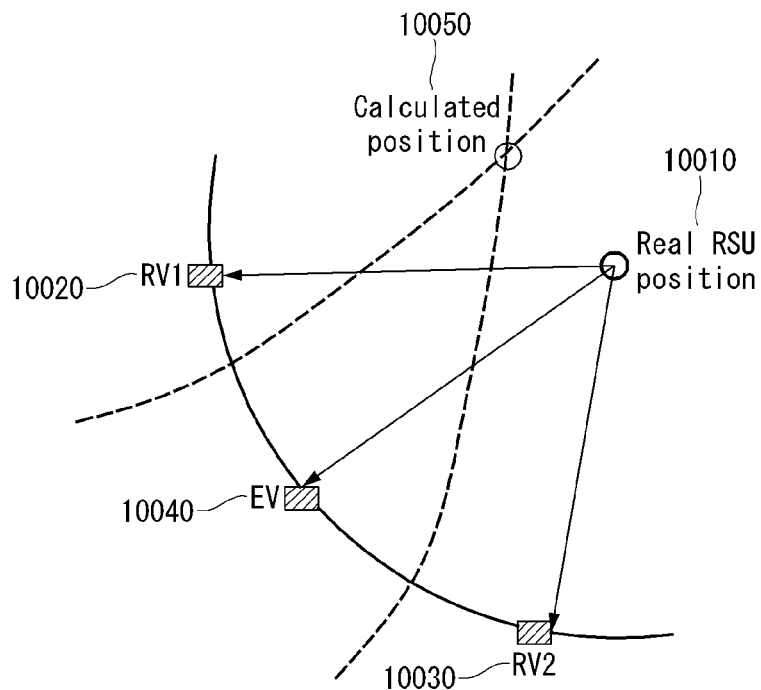
[Fig.11]
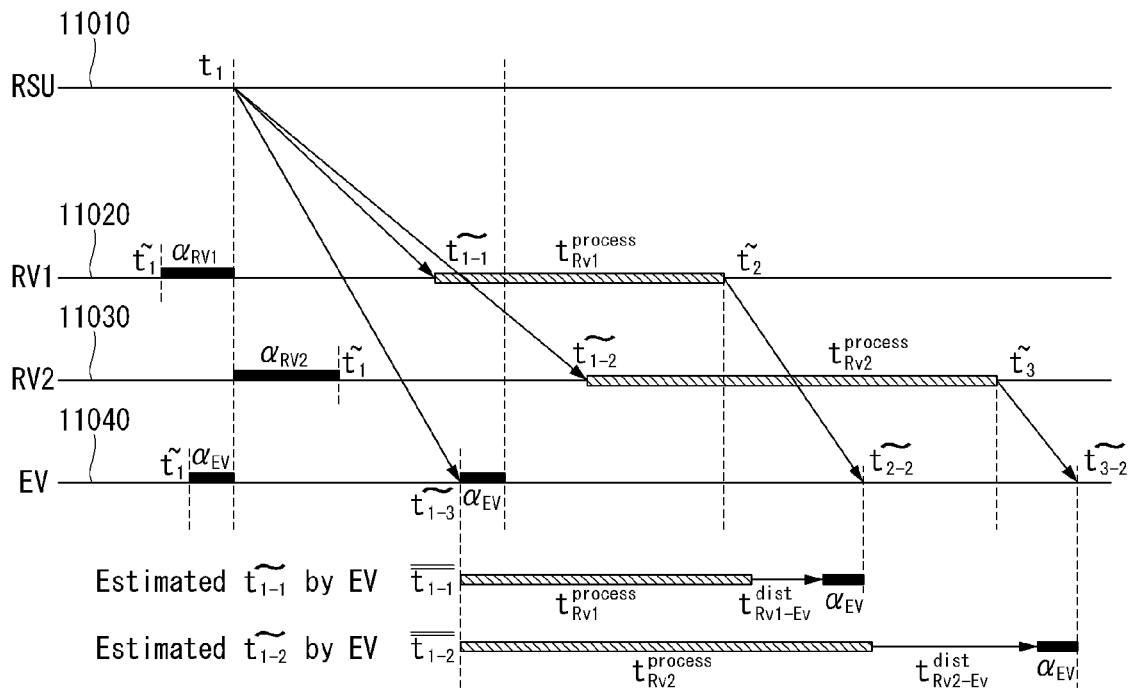

[Fig.12]

| ASN.1 Representation | |
|---|---|
| DF_Positioning_RSU | ::= SEQUENCE{ |
|     PositioningFlag | Boolean |
|     PositioningSeq | INTEGER |
|     FlagInterval | INTEGER |
|     Position | DF_3DPosition, OPTIONAL |
|     } | |

[Fig.13]

| ASN.1 Representation | |
|---|---|
| DF_Positioning_CAM | ::= SEQUENCE{ |
|     PositioningSeq | INTEGER |
|     TimeProcessing | INTEGER |
|     Position | DF_3DPosition, OPTIONAL |
|     } | |

[Fig.14]

| ASN.1 Representation | |
|---|---|
| DF_Positioning_CPM | ::= SEQUENCE{ |
|     PositioningSeq | INTEGER |
|     TimeProcessing | INTEGER |
|     Position | DF_3DPosition, OPTIONAL |
|     ObjectID | ::= SEQUENCE of INTEGER |
|     TimePropagation | ::= SEQUENCE of INTEGER |
|     CorrectedPosition | ::= SEQUENCE of DF_3DPostion |
|     } | |

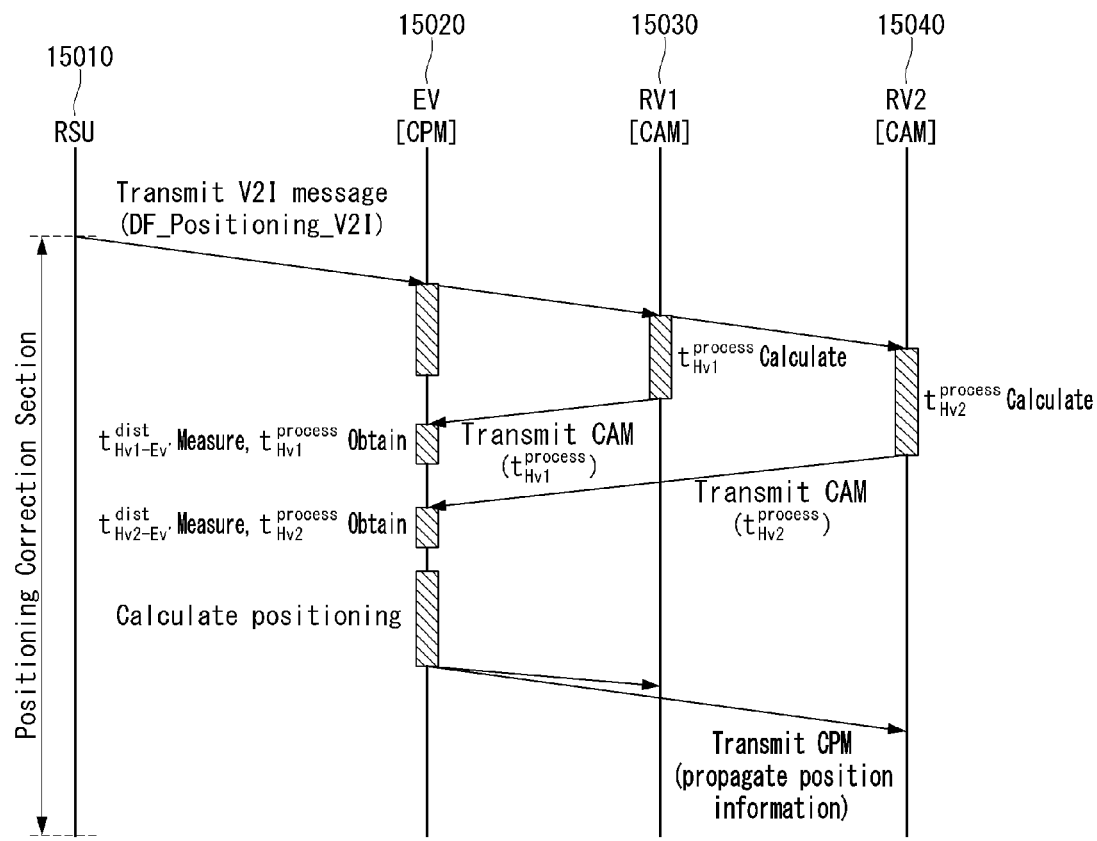
[Fig.15]

[Fig.16]
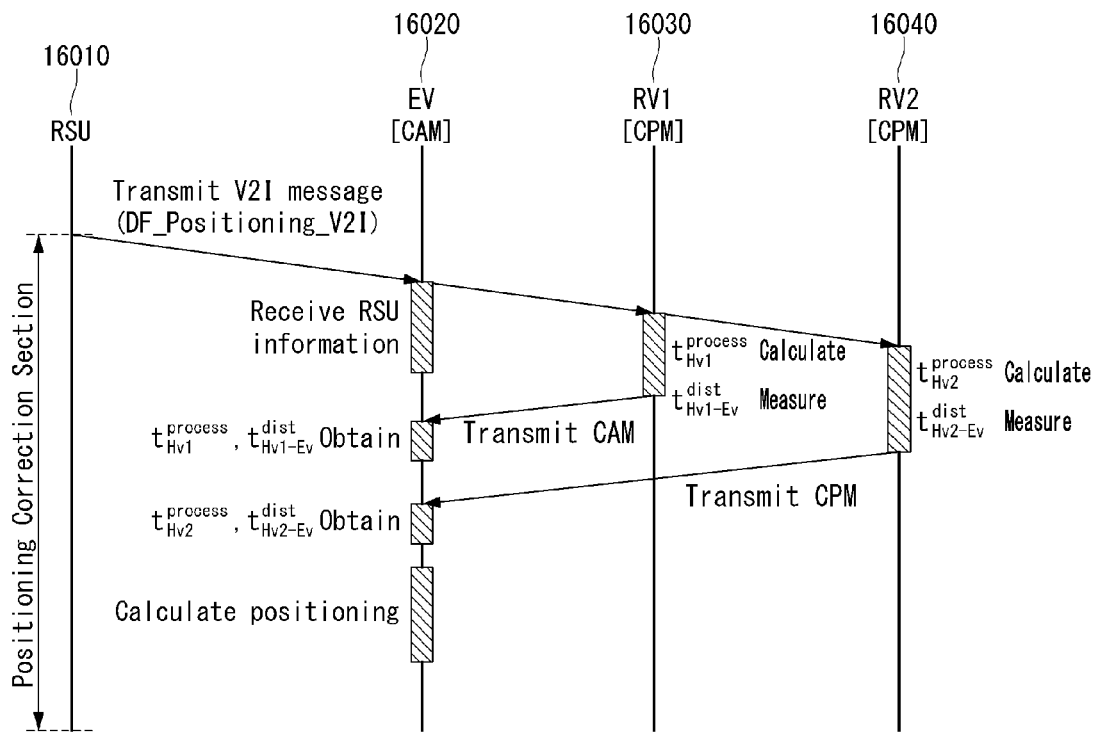
[Fig.17]
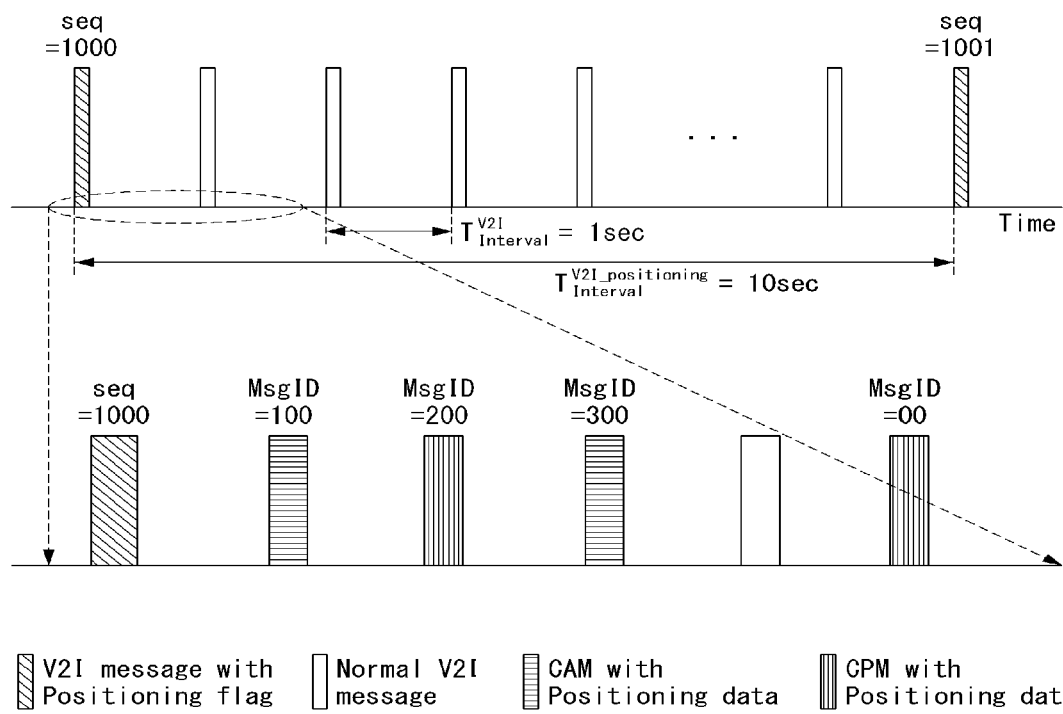

[Fig.18]
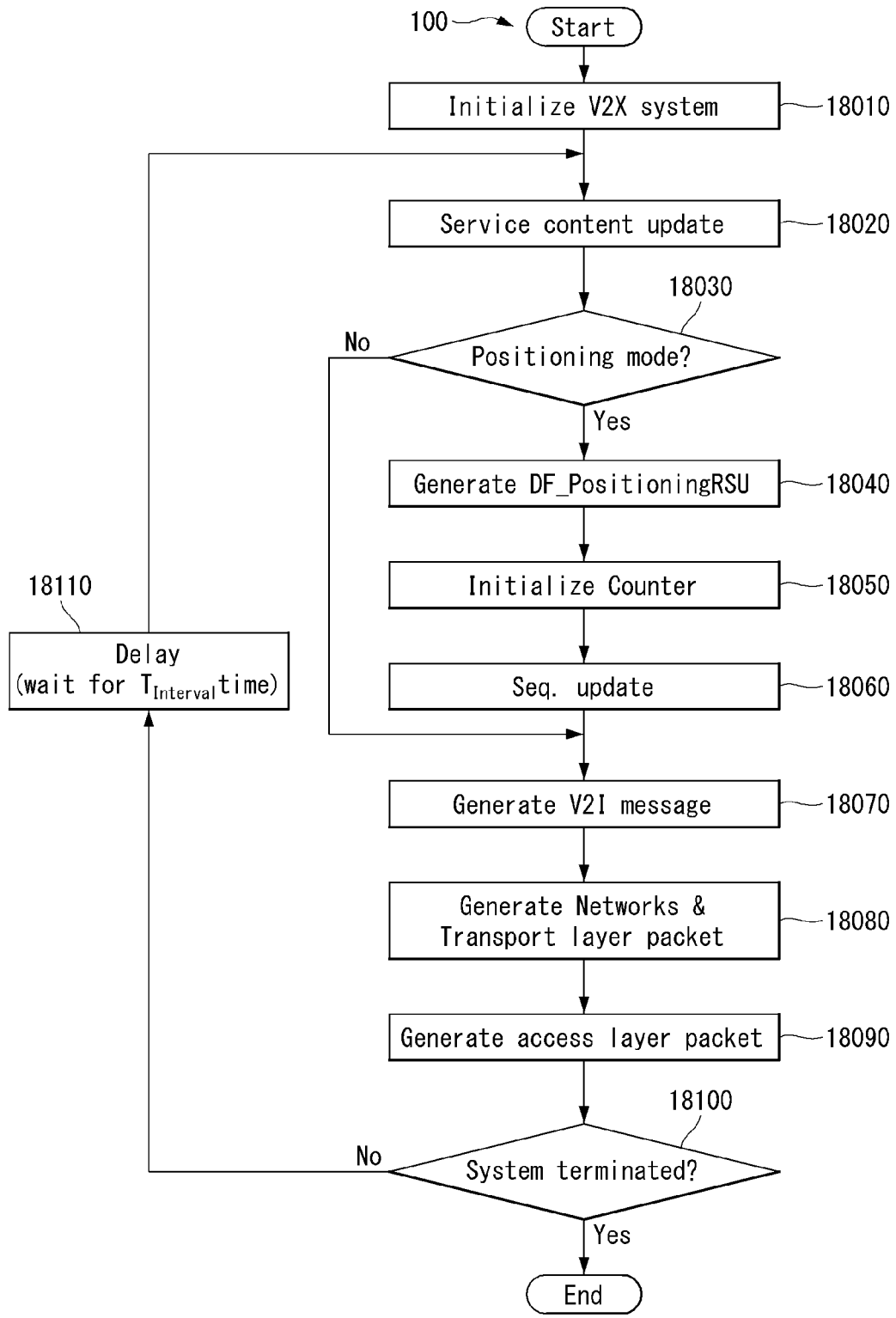

[Fig.19]
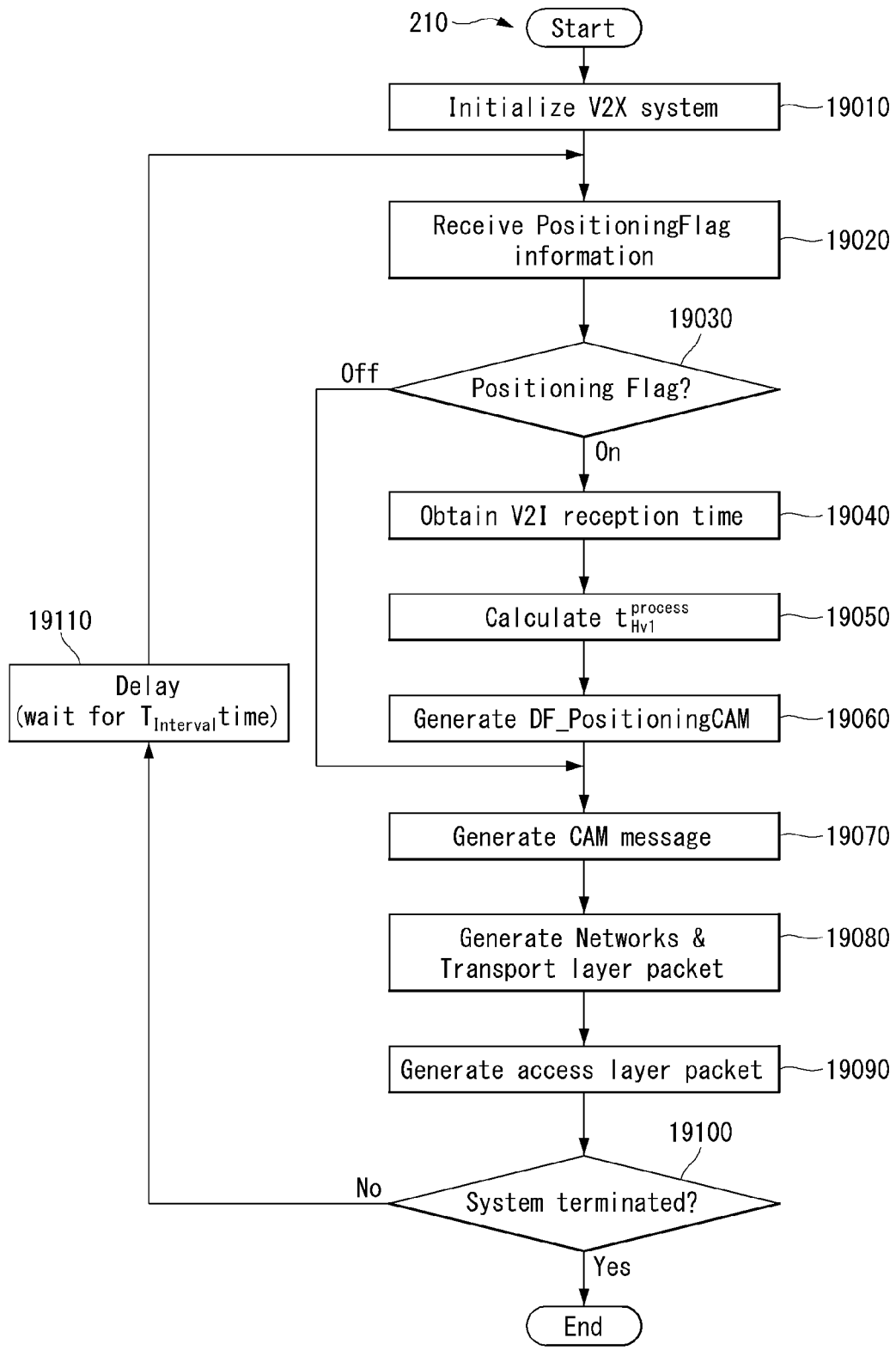

[Fig.20]
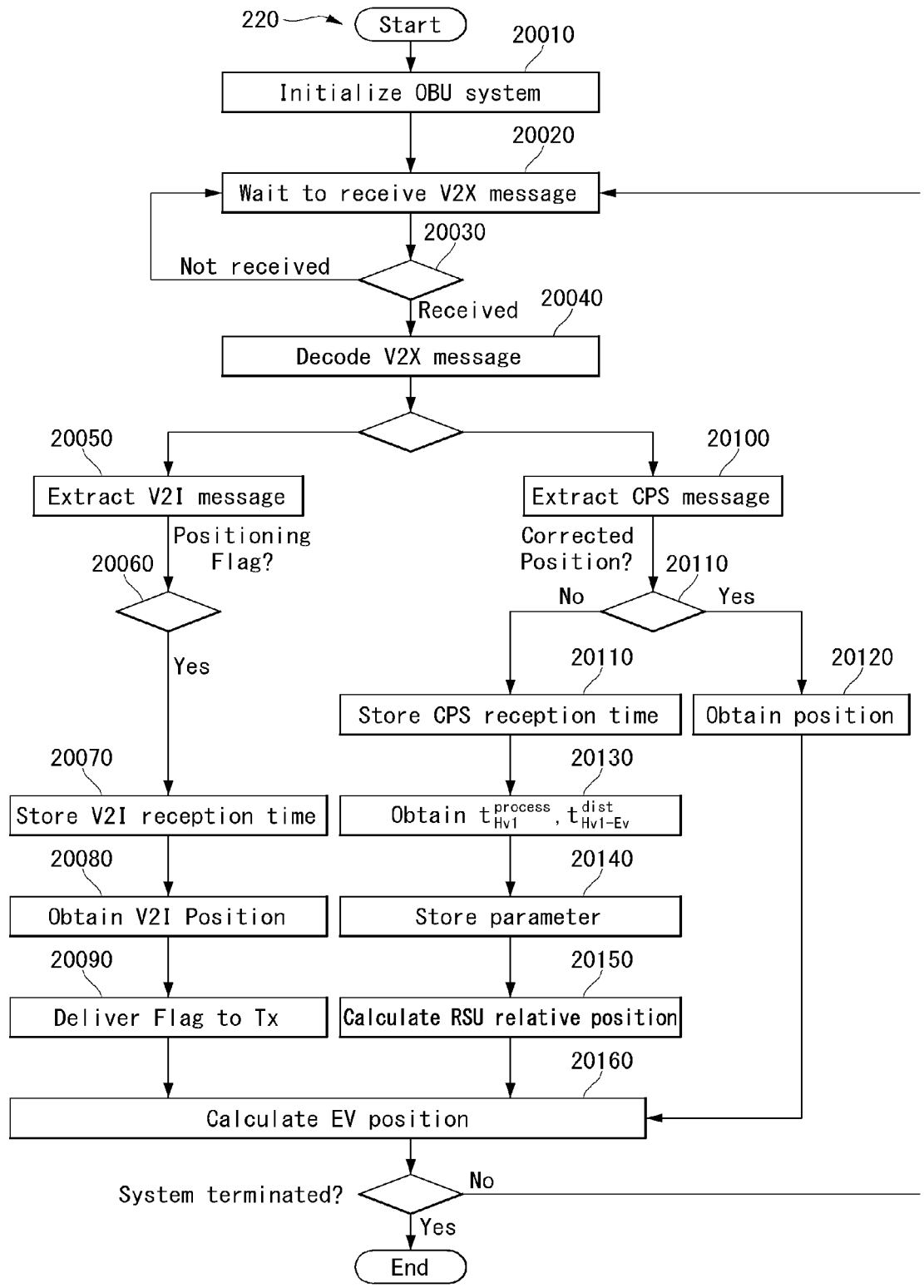

[Fig.21]
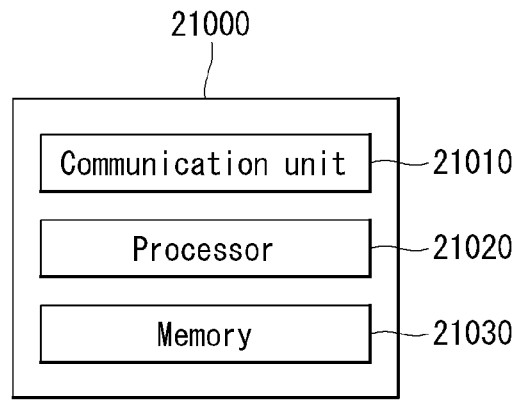
[Fig.22]
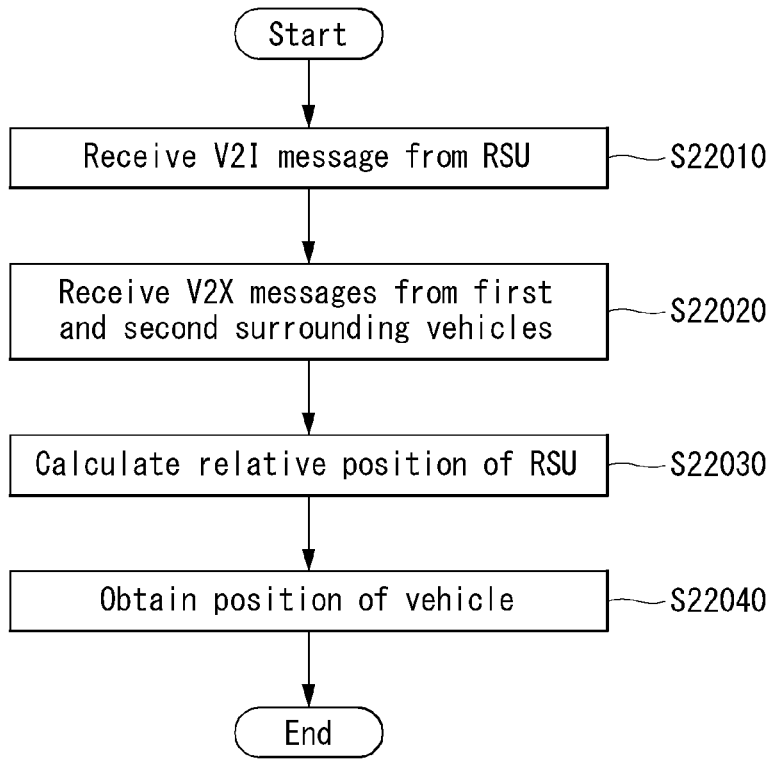

DEVICE AND METHOD FOR V2X COMMUNICATION

This application is the National Stage filing under 35 U.S.C. 371 of International Application No. PCT/KR2019/000397 filed on Jan. 10, 2019, the contents of which is hereby incorporated by reference herein in its entirety.

TECHNICAL FIELD

The present disclosure relates to an apparatus and method for vehicle to everything (V2X) communication and, more particularly, to a method of obtaining position information of a vehicle through V2X communication.

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DISCLOSURE

Technical Problem

Conventional automobiles use a GPS system using satellites to check their positions. Since the GPS system needs to receive signals from at least three satellites, it is greatly affected by the surrounding environment. Position information cannot be used in indoor environments where GPS signals are not received, such as tunnels or underground parking lots. In addition, even when the weather is bad or when driving in an urban area with many buildings, position recognition performance is attenuated.

The position recognition technology using inertial navigation is used as a compensation technology in areas where GPS does not operate. However, this technology is a system in which position errors may be accumulated, and may rather deteriorate the position recognition performance. There is a need to develop a technology to improve the above problems and improve the position recognition performance of the V2I device in an environment where GPS signals are not normally received.

Technical Solution

In order to accomplish the object, the present disclosure proposes a method and apparatus for V2X communication.

A method of obtaining position information of a vehicle through V2X communication according to an embodiment of the present disclosure may include receiving, from a road side unit (RSU), a V2I message including position information of the RSU, receiving, from each of a first surrounding vehicle and a second surrounding vehicle, a V2X message including reception time information related to the time when receiving the V2I message, calculating a relative position of the RSU based on the current vehicle, based on the reception time information and the time when the current vehicle receives the V2I message, and obtaining a position of the current vehicle based on the relative position of the RSU and the position information of the RSU.

As an embodiment, the position information of the RSU may include coordinates of the RSU, and the position of the current vehicle may be obtained by subtracting the relative position of the RSU from the coordinates of the RSU.

As an embodiment, the relative position of the RSU may be calculated using a first difference value between the time when the first surrounding vehicle receives the V2I message and the time when the current vehicle receives the V2I message and a second difference value between the time when the second surrounding vehicle receives the V2I message and the time when the current vehicle receives the V2I message.

As an embodiment, the reception time information may include time interval information from the time when the first surrounding vehicle or the second surrounding vehicle receives the V2I message to the time when the first surrounding vehicle or the second surrounding vehicle transmits the V2X message.

As an embodiment, the method may further include generating a cooperative awareness (CA) message or a collective perception (CP) message including the obtained position of the current vehicle.

A V2X communication apparatus for obtaining position information of a vehicle through V2I communication according to another embodiment of the present disclosure includes a memory storing data, a communication unit transmitting and receiving radio signals including a V2I message, and a processor configured to control the memory and the communication unit. The processor may be configured to receive, from a road side unit (RSU), a V2I message including position information of the RSU, receive, from each of a first surrounding vehicle and a second surrounding vehicle, a V2X message including reception time information related to the time when the V2I message is received, calculate a relative position of the RSU based on the current vehicle, based on the reception time information and the time when the current vehicle receives the V2I message, and obtain a position of the current vehicle based on the relative position of the RSU and the position information of the RSU.

As an embodiment, the position information of the RSU may include coordinates of the RSU, and wherein the position of the current vehicle may be obtained by subtracting the relative position of the RSU from the coordinates of the RSU.

As an embodiment, the relative position of the RSU may be calculated using a first difference value between the time when the first surrounding vehicle receives the V2I message and the time when the current vehicle receives the V2I message and a second difference value between the time when the second surrounding vehicle receives the V2I message and the time when the current vehicle receives the V2I message.

As an embodiment, the reception time information may include time interval information from the time when the first surrounding vehicle or the second surrounding vehicle receives the V2I message to the time when the first surrounding vehicle or the second surrounding vehicle transmits the V2X message.

As an embodiment, the processor may be configured to generate a cooperative awareness (CA) message or a collective perception (CP) message including the obtained position of the current vehicle.

Advantageous Effects

According to an embodiment of the present disclosure, accurate position information of a vehicle can be effectively obtained in an environment in which a GPS reception ratio is not good.

Furthermore, according to an embodiment of the present disclosure, the position of a vehicle can be accurately obtained using a road side unit (RSU) and surrounding vehicles in an environment in which time synchronization between vehicles is not performed.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the disclosure.

FIG. 2 illustrates a method of processing a V2X message according to an embodiment of the disclosure.

FIG. 3 illustrates architecture of a V2X communication apparatus which provides infrastructure services according to an embodiment of the present disclosure.

FIG. 4 is a diagram for describing a method of recognizing position information of a vehicle according to a conventional technology.

FIG. 5 is a diagram for describing a method of recognizing position information of a vehicle according to an embodiment of the present disclosure.

FIG. 6 is a diagram for describing a method of obtaining an absolute position of a vehicle according to an embodiment of the present disclosure.

FIG. 7 is a diagram illustrating a method of obtaining the position of an RSU according to an embodiment of the present disclosure.

FIG. 8 is a diagram for describing a method of obtaining a relative position of an RSU according to an embodiment of the present disclosure.

FIGS. 9 and 10 are diagrams for describing a problem which may occur if time synchronization is not presupposed.

FIG. 11 is a diagram for describing a method of obtaining a relative position of an RSU according to an embodiment of the present disclosure.

FIG. 12 is a diagram illustrating the structure of a data frame of a V2I message transmitted by a road side unit (RSU) according to an embodiment of the present disclosure.

FIG. 13 is a diagram illustrating the structure of a data frame of a cooperative awareness message (CAM) according to an embodiment of the present disclosure.

FIG. 14 is a diagram illustrating the structure of a data frame of a collective perception message (CPS) according to an embodiment of the present disclosure.

FIG. 15 is a flowchart illustrating a procedure of obtaining and propagating position information of a vehicle that provides a CP service according to an embodiment of the present disclosure.

FIG. 16 is a flowchart illustrating a procedure of obtaining and propagating position information of a vehicle that provides a CA service according to an embodiment of the present disclosure.

FIG. 17 is a diagram for describing a form in which a V2I message is transmitted according to an embodiment of the present disclosure.

FIG. 18 is a flowchart illustrating a method of generating a V2I message according to an embodiment of the present disclosure.

FIG. 19 is a flowchart illustrating a method of generating a CAM message according to an embodiment of the present disclosure.

FIG. 20 is a flowchart illustrating a method of obtaining position information according to an embodiment of the present disclosure.

FIG. 21 illustrates a configuration of a V2X communication apparatus according to an embodiment of the present disclosure.

FIG. 22 is a flowchart illustrating a method of obtaining, by a V2X communication apparatus, position information according to an embodiment of the present disclosure.

BEST MODE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 is a view illustrating a method of processing a V2X message according to an embodiment of the disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 is a view illustrating an exemplary architecture of a V2X communication device providing a CP service according to an embodiment of the disclosure.

The V2X communication device may provide various services for traffic safety and efficiency. One of the services may be a Cooperative Awareness (CA) service. The Cooperative Awareness in road traffic means that road users and roadside infrastructures can know mutual positions, dynamics and attributes. Here, the road users may be all kinds of users on a road or near a road, which act as traffic safety and control, such as a vehicle, a truck, a motorcycle, a bicycle or a pedestrian, and the roadside infrastructures may be equipment including a road sign, a traffic light or a barrier and an entrance.

This awareness of each other becomes basics of many road safety and traffic efficiency applications. This can be performed by regular exchange of information between road users at vehicle to vehicle (V2V), vehicle to infrastructure (V2I), infrastructure to vehicle (I2V) or everything to everything (X2X) which are based on a wireless network called a V2X network.

On this other hand, the cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices.

An infrastructure service may designate whether the V2I communication device of the RSU may notify other V2X communication devices about positions, dynamics and characteristics of the detected neighboring road users and other objects. For example, the infrastructure service may share this information with other V2X communication devices through transmission of an indoor positioning message (IPM). This infrastructure service may be an optional facility for all types of V2X communication devices (vehicle V2X communication device, RSU V2X communication device, personal V2X communication device, etc.) participating in road traffic.

V2I technology is about communication technology between an infrastructure and a vehicle among V2X. In the present disclosure, the infrastructure represents a fixed communication device that performs V2X communication. For example, it may be a traffic light or a communication device installed at an intersection. The infrastructure may be referred to as a road side unit (RSU). The V2I technology includes "Traffic Light Maneuver" technology that informs driving availability information such a traffic light through the RSU connected to the network, "Toad and Lane Topology" technology that informs road conditions and lane composition, "Infrastructure to Vehicle information" technology that informs the vehicle of road condition information, "Traffic Light control" technology that manages signals, etc.

As shown in FIG. 3, the ITS system provides a system corresponding technology through the infrastructure service in a facility layer as shown in the drawing below. That is, the infrastructure service may be a facility layer entity. For example, the infrastructure service may be a part of the application support domain of the facility layer. FIG. 3 exemplarily illustrates the infrastructure service in V2X communication device architecture and a logical interface for other layers and a potential logical interface for entities in the facility layer.

When transmitting, the facility layer generates/encodes a message according to an operation requested by an application, and manages the transmission of the message. When receiving, the facility layer decodes the message received through the NF-SAP at the network and transport (N&T: Network & Transport) layer and transmits the received message to the application layer. Information by message management is connected to the management layer through MF-SAP, and is connected to the security layer through SF-SAP for message security.

In the present disclosure, a transmitting V2X communication apparatus may also be denoted as a transmission V2X communication device, a transmission V2X communication apparatus, a host V2X communication apparatus, etc.

A conventional vehicle uses a GPS using satellites in order to identify its own position. The GPS is greatly influenced by surrounding environments because it needs to receive signals from at least three satellites. Location information cannot be used in an indoor environment in which a GPS signal is not received, such as a tunnel or an underground parking lot. Furthermore, when the weather is not good or when a vehicle operates in a downtown area including many buildings, position recognition performance is attenuated.

In a conventional position recognition technology, inertial navigation is used as a compensation technology in an area in which a GPS does not operate. However, the corresponding technology is a system in which position errors may be accumulated, and may deteriorate position recognition performance. Accordingly, the present disclosure proposes a method of improving such a problem and effectively obtaining position information of a vehicle through V2I communication in an environment in which a GPS signal is not received normally.

In particular, the present disclosure proposes a method of obtaining accurate position information of a vehicle by using one RSU. First, a conventional position recognition technology using three or more RSUs is described below with reference to a drawing below.

FIG. 4 is a diagram for describing a method of recognizing position information of a vehicle according to a conventional technology.

Referring to FIG. 4, in a conventional position measurement technology, three or more RSUs at already known fixed positions may be used to obtain the position of a vehicle. In this case, in order to obtain the position of an ego vehicle 4010, a propagation time or received signal strength indication (RSSI) of a signal may be used. However, positioning using the RSSI has a problem in that it is not suitable for precise position measurement because an error is great.

Accordingly, in the conventional position measurement technology, a propagation time of a signal having high precision compared to RSSI is used. If RSUs have been synchronized, a position may be measured in one way by using a time difference of arrival (TDoA) of a signal. If TDoA is used on the premise of time synchronization between RSUs, accurate positions of a plurality of vehicles can be estimated at a time. In contrast, if time synchronization has not been performed, a position including the distance between an RSU and a vehicle may be measured using a time of arrival (ToA) of a signal. However, this method has disadvantages in that position measurement in two ways is necessary and the position of one vehicle cannot be measured at a time.

When traffic safety and efficiency are considered, in order to be substantially used in a vehicle environment, a position needs to be identified at a time in one way and positions of a plurality of vehicles needs to be measured at a time. The TDoA method may be a method most suitable for a vehicle system, but the method also has a disadvantage in that RSUs must be synchronized and has a problem in that three or more RSUs in which a vehicle is placed in a line of sight (LoS) situation must be present. However, in a road environment positioned between buildings, there is a limit that the RSUs are installed to guarantee three or more LOS environments. In this case, the LoS indicates a distance or area where a straight line can be reached through a radio wave or the human eye.

Accordingly, in order to solve this problem, the present disclosure proposes a method of recognizing the position of a vehicle by using one RSU. As an embodiment, the method proposed in the present disclosure is a technology suitable for a vehicle driving environment, and may use one RSU and three or more vehicles. This is described with reference to a drawing below.

FIG. 5 is a diagram for describing a method of recognizing position information of a vehicle according to an embodiment of the present disclosure.

Referring to FIG. 5, an RSU 5010 transmits, to the surroundings, a V2I message including information on its fixed position. Vehicles that are driving around the RSU 5010 may receive the V2I message. In this case, each of the receivers (i.e., the vehicle) may notify a surrounding vehicle of the time when the V2I message was received through a cooperative awareness message (CAM) (or a collective perception message (CMP). Thereafter, an ego vehicle (or current vehicle) 5020 may obtain (or measure or estimate) a relative position of the RSU between the ego vehicle 5020 and each of the surrounding vehicles 5030 and 5040 by using its measured V2I message reception time and V2I message reception times of the surrounding vehicles received through the surrounding vehicles 5030 and 5040. In this case, the relative position of the RSU may be obtained using a difference between an RSU signal and a received signal.

In an embodiment of the present disclosure, a calculation method described hereinafter may be used to estimate an actual position value of a vehicle.

FIG. 6 is a diagram for describing a method of obtaining an absolute position of a vehicle according to an embodiment of the present disclosure.

Referring to FIG. 6, an ego vehicle 6020 first sets its temporary position (or relative position) as [0,0]. Furthermore, the ego vehicle 6020 may obtain a relative position of each of an RV1 vehicle 6030 and an RV2 vehicle 6040 based on the ego vehicle 6020 by using a sensor mounted thereon. As an embodiment, in the coordinates of each of the RV1 vehicle 6030 and the RV2 vehicle 6040, a Y axis may be set to be directed toward a north direction. As illustrated in FIG. 6, [−10, 500] values may be obtained as a relative position of the RV1 vehicle 6030. [400, 10] values may be obtained as a relative position of the RV2 vehicle 6040.

Thereafter, the ego vehicle 6020 receives a V2I message from an RSU 6010. The V2I message may include absolute position (or absolute coordinates) information of the RSU. For example, the absolute position of the RSU may be a coordinate value of a GPS, such as [34.11'.23", 20.44'.26"], as illustrated in FIG. 6.

Furthermore, the ego vehicle 6020 may calculate a relative position of the RSU 6010 by using signals received from the RSU 6010, the RV1 vehicle 6030, and the RV2 vehicle 6040. As illustrated in FIG. 6, the relative position of the RSU 6010 may be calculated as [1000, 1200].

Finally, the ego vehicle 6020 may calculate an absolute position of the ego vehicle 6020 by using the calculated relative position of the RSU 6010 and the absolute position of the RSU 6010 obtained from the V2I message. In this case, Equation 1 below may be used.

$$Pos_{estimated}^{EV} = Pos_{real}^{RSU} - Pos_{relative}^{RSU} \quad \text{[Equation 1]}$$

In Equation 1, $Pos_{estimated}^{EV}$ indicates the absolute position (or calculated position) of the ego vehicle 6020, $Pos_{real}^{RSU}$ indicates the absolute position of the RSU 6010, and $Pos_{relative}^{RSU}$ indicates the relative position of the RSU 6010.

The absolute position of the ego vehicle 6020 may be obtained by subtracting a relative RSU value (the relative position of the RSU 6010) from an actual RSU value (i.e., the absolute position of the RSU 6010).

Furthermore, the absolute position of each surrounding vehicle (the RV1 vehicle 6030, the RV2 vehicle 6040) may be estimated using the estimated absolute value of the ego vehicle 6020 by using Equation 1. In this case, Equation 2 and Equation 3 below may be used.

$$Pos_{estimated}^{RV1} = Pos_{estimatied}^{EV} + Pos_{relative}^{RV1} \quad \text{[Equation 2]}$$

$$Pos_{estimated}^{RV2} = Pos_{estimatied}^{EV} + Pos_{relative}^{RV2} \quad \text{[Equation 3]}$$

In Equation 2, $Pos_{estimated}^{RV1}$ indicates the absolute position (or calculated position) of the RV1 vehicle 6030, and $Pos_{relative}^{RV1}$ indicates the relative position of the RV1 vehicle 6030. Furthermore, in Equation 3, $Pos_{estimated}^{RV2}$ indicates the absolute position (or calculated position) of the RV2 vehicle 6040, and $Pos_{relative}^{RV2}$ indicates the relative position of the RV2 vehicle 6040.

In an embodiment, the position information of the ego vehicle 6020 or the surrounding vehicles (the RV1 vehicle 6030 and the RV2 vehicle 6040) obtained using Equations 1 to 3 may be included in a CAM message or a CPM message.

Hereinafter, a method of obtaining a relative position (or may also be denoted as a predicted value or a predicted position) of an RSU is described in detail.

FIG. 7 is a diagram illustrating a method of obtaining the position of an RSU according to an embodiment of the present disclosure.

Referring to FIG. 7, in an embodiment of the present disclosure, a procedure for transmitting and receiving signals according to the TDoA method by using one RSU 7010 may be performed. First, the RSU 7010 transmits a V2I message at a time t1. Each of the vehicles (i.e., an RV1 vehicle 7020, an RV2 vehicle 7030, and an ego vehicle 7040 (or current vehicle)) receives the V2I message transmitted by the RSU 7010.

In FIG. 7, a case where distances from the RSU 7010 to the vehicles (i.e., the RV1 vehicle 7020, the RV2 vehicle 7030, and the ego vehicle 7040 (or the current vehicle)) are the same is assumed. If the distances from the RSU 7010 are the same, the RV1 vehicle 7020, the RV2 vehicle 7030, and the ego vehicle 7040 may receive the V2I message at the same times t1-1, t1-2, and t1-3. Thereafter, when transmitting its message (e.g., CAM or CPM) in its message transmission period, each of the RV1 vehicle 7020 and the RV2 vehicle 7030 may notify the ego vehicle 7040 of the time when the V2I message was received. That is, the ego vehicle 7040 may receive a first V2X message from the RV1 vehicle 7020 at a time t2-3, and may receive a second V2X message from the RV2 vehicle 7030 at a time t3-3. In this case, the first V2X message includes information on the time when the RV1 vehicle 7020 received the V2I message. The second V2X message may include information on the time when the RV2 vehicle 7030 received the V2I message. As an embodiment, the first V2X message may be a CAM message or a CPM message.

Accordingly, the ego vehicle 7040 may recognize the V2I message reception times of all the vehicles after the time t3-3, and may calculate relative position coordinates of the RSU 7010.

In order to apply the TDoA method, each of the vehicles may compare differences between signals received from the RSU 7010. In FIG. 7, it has been assumed that the vehicles are disposed at the same distance from the RSU 7010. Accordingly, as in Equation 4 below, a difference between signal reception times of the two vehicles transmitted by the RSU 7010 may have a value of 0.

$$\Delta_{RV1-EV} = t_{1-1} - t_{1-3} = 0 \quad \text{[Equation 4]}$$
$$\Delta_{RV2-EV} = t_{1-2} - t_{1-3} = 0$$

In Equation 4, $\Delta_{RV1-EV}$ indicates a difference between the times when the RV1 vehicle 7020 and the ego vehicle 7040 receive the V2I message. $\Delta_{RV2-EV}$ indicates a difference the times when the RV2 vehicle 7030 and the ego vehicle 7040 receive the V2I message. Furthermore, $t_{1-1}$, $t_{1-2}$, and $t_{1-3}$ indicate the times when the RV1 vehicle 7020 the vehicle, the RV2 vehicle 7030, and the ego vehicle 7040 receive signal transmitted by the RSU 7010, respectively.

Referring to Equation 4, a difference between the time when each of the surrounding vehicles (i.e., the RV1 vehicle 7020 and the RV2 vehicle 7030) received the V2I message and the time when the ego vehicle 7040 received the V2I message may be calculated. A relative position (or predicted value or predicted position) of the RSU 7010 based on the ego vehicle 7040 may be obtained using the difference.

FIG. 8 is a diagram for describing a method of obtaining a relative position of an RSU according to an embodiment of the present disclosure.

Referring to FIG. 8, a case where distances from an RSU 8010 to surrounding vehicles (i.e., an RV1 vehicle 8020, an RV2 vehicle 8040, and an ego vehicle 8030 (or a current vehicle)) are the same is assumed. If a difference between times when the RV1 vehicle 8020 and the ego vehicle 8030 receive a V2I message is obtained using the method described with reference to FIG. 7, as in the TDoA method, a hyperbola, such as that illustrated in FIG. 8, may be illustrated between the RV1 vehicle 8020 and the ego vehicle 8030. In the present embodiment, since there is no difference between times when the RV1 vehicle 8020 and the ego vehicle 8030 receive a V2I signal, the distance between the RSU 8010 and the two vehicles may be the same. That is, the RSU 8010 may be disposed on a dotted line 8050 illustrated between the RV1 vehicle 8020 and the ego vehicle 8030.

Likewise, even in the case of a difference between times when the RV2 vehicle 8040 and the ego vehicle 8030 received the V2I message, a position where the RSU 8010 may be present may be represented using a hyperbola. In the present embodiment, since there is no difference between the times when the RV2 vehicle 8040 and the ego vehicle 8030 receive the V2I signal, the RSU 8010 may be disposed on a dotted line 8060 illustrated between the RV2 vehicle 8040 and the ego vehicle 8030.

Furthermore, an intersection point of a straight line or a curve may be obtained based on the aforementioned two time differences. The intersection point may be determined (or obtained) as a relative position of the RSU 8010.

In a position recognition method using the aforementioned TDoA, times between surrounding vehicles (e.g., EV, RV1, and RV2) need to be synchronized. If time synchronization between the vehicles has not been performed, although the surrounding vehicles receive an RSU signal at the same time, the vehicles may operate as if they receive the RSU signal at different times due to a time synchronization error. In other words, if times between a current vehicle and surrounding vehicles RV1 and RV2 are not synchronized, an error may occur in position measurement. An error which may occur is described with reference to drawings below.

FIGS. 9 and 10 are diagrams for describing a problem which may occur if time synchronization is not presupposed.

Referring to FIGS. 9 and 10, a case where distances from an RSU 9010 to surrounding vehicles (i.e., an RV1 vehicle 9020, an RV2 vehicle 9030, and an ego vehicle 9040 (or a current vehicle)) are the same is assumed. Furthermore, a case where time of the RV1 vehicle 9020 is ahead of a reference time (i.e., time of the RSU 9010) by α_RV1, time of the RV2 vehicle 9030 is behind the reference time by α_RV2, and time of the ego vehicle (or the current vehicle) 9040 is ahead of the reference time by α_EV is assumed.

As in the embodiments described with reference to FIGS. 7 and 8, although the times when the signal (i.e., the V2I message) of the RSU 9010*is* is actually received are the same, if times between the surrounding vehicles 9020 and 9030 and the ego vehicle 9040 are not synchronized, it may be recognized that the signal of the RSU 9010 was received at different times.

That is, as in a conventional technology, although the RV1 vehicle 9020 receives the signal at a time t1-1, the RV1 vehicle 9020 may notify surroundings that the signal of the RSU 9010 is received early because time set in the RV1 vehicle is ahead of the reference time by α_RV1. In contrast, the RV2 vehicle 9030 receives the signal of the RSU 9010 at the same time as the RV1 vehicle 9020, but the RV2 vehicle 9030 may notify surroundings of a time added by a time synchronization error (i.e., α_RV2) of the RV2 vehicle 9030.

Equation 5 below indicates V2I signal reception times t1-1 and t1-2 of the surrounding vehicles and a V2I signal reception time t1-3 of the ego vehicle 9040, which are received by the ego vehicle 9040.

$$\widetilde{t_{1-1}} = \widetilde{t_1} + t^{dist}_{rsu-Rv1} + \alpha_{Rv1} \quad \text{[Equation 5]}$$
$$\widetilde{t_{1-2}} = \widetilde{t_1} + t^{dist}_{rsu-Rv2} + \alpha_{Rv2}$$
$$\widetilde{t_{1-3}} = \widetilde{t_1} + t^{dist}_{rsu-Ev} + \alpha_{Ev}$$

In Equation 5, $\widetilde{t_{1-1}}$ indicates the time when the RV1 vehicle 9020 received the signal of the RSU 9010, $\widetilde{t_{1-2}}$ indicates the time when the RV2 vehicle 9030 receives the signal of the RSU 9010, and $\widetilde{t_{1-3}}$ indicates the time when the ego vehicle 9040 receives the signal of the RSU

9010. $\tilde{t}_1$ indicates the time when the RSU 9010 transmits the signal. $t_{rsu-Rv1}^{dist}$ indicates a signal delivery time (may also be denoted as a signal distance or a signal arrival distance in the present disclosure) according to a distance between the RSU 9010 and the RV1 vehicle 9020. $t_{rsu-RV2}^{dist}$ indicates a signal delivery time according to the distance between the RSU 9010 and the RV2 vehicle 9030. $t_{rsu-EV}^{dist}$ indicates a signal delivery time according to the distance between the RSU 9010 and the ego vehicle 9040. $\alpha_{Rv1}$, $\alpha_{RV2}$, and $\alpha_{Ev}$ indicate time synchronization errors of the RV1 vehicle 9020, the RV2 vehicle 9030, and the ego vehicle 9040, respectively.

Referring to Equation 5, each of the V2I signal reception time of a surrounding vehicle received by the ego vehicle 9040 and the time when the ego vehicle 9040 actually receives the V2I signal may include an error attributable to the time set in each vehicle.

As described above, if a difference between V2I message reception times is calculated using a value including an error, the difference may have a non-zero value because it includes a time synchronization error as in Equation 6.

$$\Delta_{RV1-EV} = \widetilde{t_{1-1}} - \widetilde{t_{1-3}} = \alpha_{RV1} - \alpha_{EV} \neq 0 \quad \text{[Equation 6]}$$
$$\Delta_{RV2-EV} = \widetilde{t_{1-2}} - \widetilde{t_{1-3}} = \alpha_{RV2} - \alpha_{EV} \neq 0$$

In Equation 6, $\Delta_{RV1-EV}$ indicates a difference between times when the RV1 vehicle 9020 and the ego vehicle 9040 received the V2I message, and $\Delta_{RV2-EV}$ indicates a difference between times when the RV2 vehicle 9030 and the ego vehicle 9040 received the V2I message. Furthermore, $t_{1-1}$, $t_{1-2}$, and $t_{1-3}$ indicate the times when the RV1 vehicle 9020, the RV2 vehicle 9030, and the ego vehicle 9040 received the signal transmitted by the RSU 9010, respectively.

Referring to Equation 5, it can be seen that an error is included in a position measurement value if synchronization is not performed between the vehicles.

Referring to FIG. 10, it may be seen that an erroneous position 10050 of an RSU, such as that illustrated in FIG. 10, is obtained if the position of the RSU is calculated with a time synchronization error included as described above. Practically, an RSU 10010 is present at the same distance as surrounding vehicles as in the above assumption, but an ego vehicle 10040 has delta values of non-zero ($\alpha$_RV1)–($\alpha$_EV) and ($\alpha$_RV2–$\alpha$_EV) values each indicative of a difference between times when the signal (i.e., the V2I message) was received due to time synchronization. If a hyperbola obtained accordingly is used, a problem in that the position of the RSU is erroneously estimated as a different position 10050 as illustrated in FIG. 10 may occur.

Accordingly, the present disclosure proposes a method of removing an error attributable to time synchronization in the proposed method of obtaining the position of a vehicle by using one RSU.

FIG. 11 is a diagram for describing a method of obtaining a relative position of an RSU according to an embodiment of the present disclosure.

In an embodiment of the present disclosure, each of surrounding vehicles may measure the time when a V2I message is received using a time set in its vehicle, and may notify an interval (or difference) between the time when the V2I message is received and the time when its signal (e.g., a CAM or CPM message) is transmitted, instead of the measured reception time. That is, a V2X message transmitted by the surrounding vehicle may include information on the interval (or difference) between the time when the V2I message is received and the time when the V2X message is transmitted.

Referring to FIG. 11, a case where distances from an RSU 11010 to surrounding vehicles (i.e., an RV1 vehicle 11020, an RV2 vehicle 11030, and an ego vehicle 11040 (or a current vehicle)) are the same is assumed. Furthermore, a case where time of the RV1 vehicle 11020 is ahead of a reference time (i.e., time of the RSU 11010) by $\alpha$_RV1, time of the RV2 vehicle 11030 is behind the reference time by $\alpha$_RV2, and time of the ego vehicle (or the current vehicle) 11040 is ahead of the reference time by $\alpha$_EV is assumed.

Each of the RV1 vehicle 11020 and the RV2 vehicle 11030 may transmit a message including an interval (or difference) between the time when the V2I message is received and the time when its signal (e.g., a CAM or CPM message) is transmitted as in Equation 7.

$$t_{RV1}^{process} = \tilde{t}_2 - \widetilde{t_{1-1}} = t_2 + \alpha_{RV1} - (t_{1-1} + \alpha_{RV1}) = t_2 - t_{1-1} \quad \text{[Equation 7]}$$
$$t_{RV2}^{process} = \tilde{t}_3 - \widetilde{t_{1-2}} = t_3 + \alpha_{RV2} - (t_{1-2} + \alpha_{RV2}) = t_3 - t_{1-2}$$

In Equation 7, $t_{RV1}^{process}$ indicates a processing time indicative of a difference between the time when the RV1 vehicle 11020 received the signal from the RSU 11010 and the time when the RV1 vehicle 11020 transmits the signal, and $t_{RV2}^{process}$ indicates a processing time indicative of a difference between the time when the RV2 vehicle 11030 received the signal from the RSU 11010 and the time when the RV2 vehicle 11030 transmits the signal.

Referring to Equation 7, each of the RV1 vehicle 11020 and the RV2 vehicle 11030 may calculate (or measure) a time difference between the V2I signal reception time and the V2X signal transmission time. Each of the time difference measured as described above may be delivered to the ego vehicle 11040 through a V2X message. The signals are used along with a value measured through the timer of the ego vehicle 11040, and thus may have the same time error (i.e., $\alpha$_EV). This may be represented as in Equation 8 below.

$$\widetilde{t_{1-3}} = t_{1-3} + \alpha_{EV} = t_1 + t_{rsu-EV}^{dist} + \alpha_{EV} \quad \text{[Equation 8]}$$
$$\overline{\overline{t_{1-1}}} = t_{2-2} + \alpha_{EV} - (t_{Hv1}^{process} + t_{rsu-Hv1}^{dist}) = t_1 + t_{rsu-RV1}^{dist} + \alpha_{EV}$$
$$\overline{\overline{t_{1-2}}} = t_{3-2} + \alpha_{EV} - (t_{Hv2}^{process} + t_{rsu-Hv2}^{dist}) = t_1 + t_{rsu-RV2}^{dist} + \alpha_{EV}$$

Referring to Equation 8, a time t1-3 when the ego vehicle 11040 received the V2I signal may be calculated by summing the time when the RSU 1101 transmits the V2I signal, a signal arrival time from the RSU 1101 to the ego vehicle 11040, and the time error $\alpha$_EV of the ego vehicle 11040. A time $\overline{t_{1-1}}$ when the RV1 vehicle 11020 received the V2I signal may be calculated (estimated) by summing the time when the RSU 1101 transmits the V2I signal, a signal arrival time from the RSU 1101 to the RV1 vehicle 11020, and the time error $\alpha$_EV of the ego vehicle 11040. Furthermore, a time $\overline{t_{1-2}}$ when the RV2 vehicle 11030 received the V2I signal may be calculated (estimated) by summing the time when the RSU 1101 transmits the V2I signal, a signal arrival time from the RSU 1101 to the RV2 vehicle 11030, and the time error $\alpha$_EV of the ego vehicle 11040.

Thereafter, a V2I signal reception time difference may be calculated using the values calculated using Equation 8. In this case, Equation 9 below may be used. In this case, the time error of the ego vehicle 11040 may be removed.

$$\Delta_{RV1-EV} = \widetilde{\overline{t_{1-1}}} - \widetilde{t_{1-3}} = t_{rsu-RV1}^{dist} - t_{rsu-EV}^{dist} \quad \text{[Equation 9]}$$

$$\Delta_{RV2-EV} = \widetilde{\overline{t_{1-2}}} - \widetilde{t_{1-3}} = t_{rsu-RV2}^{dist} - t_{rsu-EV}^{dist}$$

As an embodiment, each of the surrounding vehicles may transmit the processing time (i.e., $t_{Hv1}^{process}$, $t_{Hv2}^{process}$ in Equation 7) indicative of a time difference between the time when the V2I signal was received and the time when the V2X signal is transmitted. The current vehicle that received the processing times from the surrounding vehicle may measure the time (i.e., $\widetilde{t_{1-3}}$ in Equation 8) when the V2I signal was received from the RSU and the times (i.e., $\widetilde{t_{2-2}}$ and $\widetilde{t_{3-2}}$ in Equation 8) when the V2X signals were received from the surrounding vehicles. Furthermore, the current vehicle may measure the distances (i.e., $t_{rsu-RV1}^{dist}$ and $t_{rsu-RV2}^{dist}$ in Equation 9) between the current vehicle and the surrounding vehicles by using a sensor mounted on the current vehicle. For example, the sensor may be an ADAS sensor.

According to an embodiment of the present disclosure, even in an environment in which time synchronization is not performed, the position of a vehicle can be accurately obtained using an RSU and surrounding vehicles. In other words, according to an embodiment of the present disclosure, an error occurring because time synchronization is not performed can be perfectly solved by transmitting information on a time difference between the reception of a V2I signal and the transmission of a V2X signal.

The method of measuring the position of a vehicle by using only one RSU by considering a substantial vehicle operation environment has been described above. Hereinafter, message components for applying the method proposed in the present disclosure is proposed. As an embodiment, the format of a message transmitted by an RSU, the format of a message transmitted by the existing CAM vehicle not having a sensor function, and the format of a message transmitted by a CPS vehicle having a sensor function are described. A V2X vehicle may transmit a CAM message or a CPM message in order to periodically notify surroundings of information as described above. In this case, a case where a vehicle having a sensor function transmits a CPM message is basically described, but the present disclosure is not limited thereto. A vehicle not having a sensor function may also transmit a CAM message and/or a CPM message.

FIG. 12 is a diagram illustrating the structure of a data frame of a V2I message transmitted by a road side unit (RSU) according to an embodiment of the present disclosure.

Referring to FIG. 12, for the one-RSU positioning technology (i.e., a position information acquisition technology using one RUS) proposed in the present disclosure, a V2I message (or may also be denoted as an 12V message or an RSU message) may include a positioning RSU data frame. Specifically, DF_positioning_RSU may include "PositioningFlag", "PositoningSeq", "FlagInterval" and/or "Position" fields (or parameters or data elements).

The PositoningFlag field may be indicated using a Boolean method. If a V2I signal (i.e., V2I message) is a signal that requires a positioning operation, a corresponding flag value may be set as "true." The PositoningSeq field may be set (or defined) as an integer, and may be used for the synchronization for the transmission and reception of positioning signals through a corresponding value. The FlagInterval field may be set as an integer, and indicates a time period (or a time interval) in which a Positioning Flag is transmitted. Accordingly, a receiver may predict a period. Furthermore, the Position field may include information on a fixed position of the RSU. For example, the Position field may use DF_3DPosition, and may be defined as OPTIONAL. If a Position value was transmitted in a previous message, the Position field may not be included. If a Position value was not transmitted in a previous message, the Position field may be included. The DF_positioning_RSU data frame proposed in FIG. 12 may be added to (or included in) a V2I message (e.g., a CAM, MAP, SPAT message).

FIG. 13 is a diagram illustrating the structure of a data frame of a cooperative awareness message (CAM) according to an embodiment of the present disclosure.

Referring to FIG. 13, for the one-RSU positioning technology (i.e., the position information acquisition technology using one RUS) proposed in the present disclosure, a CAM message may include a positioning CAM data frame, such as that illustrated in FIG. 13. Specifically, DF_positioning_CAM may include "PositioningSeq", "TimeProcessing", and "Position" fields (or parameters or data elements).

The PositoningSeq field may be set (or defined) as an integer, and may be used for synchronization for the transmission and reception of positioning signals. As an embodiment, when the processing time described above with reference to FIG. 11 is calculated, a PositioningSeq value of the V2I message may be inserted. The TimeProcessing field may be set (or defined) as an integer, and includes processing time information from the time when a V2I message was received to the time when a CAM message is transmitted. The Position field indicates its own position of a vehicle that transmits the CAM message, may use DF_3DPosition, and may be defined as OPTIONAL. The DF_positioning_CAM data frame proposed in FIG. 13 may be added to (or included in) the CAM message.

FIG. 14 is a diagram illustrating the structure of a data frame of a collective perception message (CPS) according to an embodiment of the present disclosure.

Referring to FIG. 14, for the one-RSU positioning technology (i.e., the position information acquisition technology using one RUS) proposed in the present disclosure, the CPM message may include a positioning CPM data frame, such as that illustrated in FIG. 14. Specifically, DF_positioning_CPM may include "PositioningSeq", "TimeProcessing", and "Position" fields (or parameters or data elements).

PositoningSeq may be set (or defined) an integer, and may be used for synchronization for the transmission and reception of positioning signals. As an embodiment, when the processing time described above with reference to FIG. 11 is calculated, a PositioningSeq value of the V2I message may be inserted. The TimeProcessing field may be set (or defined) as an integer, and includes processing time information from the time when the V2I message was received to the time when the CAM message is transmitted. The Position field indicates its own position of a vehicle that transmits the CAM message, may use DF_3DPosition, and may be defined as OPTIONAL.

Furthermore, a vehicle may transmit, to surrounding vehicles, time propagation (TimePropagation) information for each object through the CPM message. In this case, the time propagation information indicates information that represents, as a signal delivery distance time, the distance between each object and the vehicle that transmits the CPM message. Specifically, in order to transmit time propagation (TimePropagation) information for each object, the CPM message may include ObjectID and/or TimePropagation fields (or parameters or data elements), and each value thereof may be defined as a sequence.

The ObjectID field indicates the ID of an object for identifying the object, and may be defined as an integer. The ObjectID field may use MessageID transmitted by each object. The TimePropagation field represents, as a time, the distance between each object and a vehicle that provides a CP service, and may be defined as an integer. A CorrectedPositon field indicates its own position of a vehicle that transmits a CPM message, and may use DF_3DPosition. The CorrectedPositon field may include its own accurate position information obtained using the method proposed in the present disclosure. The positioning CPM data frame proposed in FIG. 14 may be added to (or included in) the CPM.

The algorithms and message structures for the one-RSU positioning technology (i.e., the position information acquisition technology using one RUS) have been described above. Hereinafter, a method of operating a message is described.

FIG. 15 is a flowchart illustrating a procedure of obtaining and propagating position information of a vehicle that provides a CP service according to an embodiment of the present disclosure.

Referring to FIG. 15, an RSU 15010 may transmit, to surrounding vehicles, a V2I message (or a V2I signal, an RSU signal, an RSU message, an 12V signal or an 12V message) including the Positioning V2I data frame described with reference to FIG. 11. The surrounding vehicles that received the V2I message from the RSU 15010 may measure the time when the V2I message was received. A vehicle that transmits a CAM may calculate a processing time indicative of a time interval between the time when the V2I message was received and the time when the CAM is transmitted, and may transmit the processing time. A vehicle that transmits a CPM may calculate a processing time indicative of a time interval between the time when the V2I message was received and the time when the CPM is transmitted, and may transmit the processing time. Furthermore, the vehicle may transmit information on detected time distances between objects through the CPM.

When receiving a V2I message whose positioning flag is on, an ego vehicle (or a current vehicle) 15020 that provides a CP service first measures the time when the V2I message was received. Thereafter, the ego vehicle receives the CAMs from the surrounding vehicles 15030 and 15040. In this case, the CAM may include processing time information from the time when the V2I message was received and the time when the CAM message is transmitted. In the present embodiment, a case where the surrounding vehicles 15030 and 15040 transmit the CAMs is assumed, but the present disclosure is not limited thereto. The surrounding vehicles may transmit CPMs, and the CPMs may identically include the processing time information.

When receiving two or more processing times from the surrounding vehicles 15030 and 15040, the ego vehicle 15020 measures distances from the vehicles that transmitted the CAMs by using a sensor mounted on the vehicle. Furthermore, the ego vehicle 15020 calculates a relative distance (or position) of the RSU by using the processing times received from the surrounding vehicles 15030 and 15040 and the distance times measured when the CAMs were received. Thereafter, the ego vehicle 15020 may calculate (or estimate) its absolute position by using an absolute position value of the RSU. The ego vehicle 15020 may transmit calculated position information to the surrounding vehicles. As an embodiment, the CPM transmitted by the ego vehicle 15020 may include the calculated position information.

FIG. 16 is a flowchart illustrating a procedure of obtaining and propagating position information of a vehicle that provides a CA service according to an embodiment of the present disclosure.

Referring to FIG. 16, a case where an ego vehicle (or a current vehicle) 16020 transmits a CAM is assumed. Descriptions of FIG. 16 that overlap those of FIG. 15 are omitted.

When receiving a V2I message whose positioning flag is on, the ego vehicle (or current vehicle) 16020 that provides a CA service first measures the time when the V2I message is received. Thereafter, the ego vehicle receives CPMs from surrounding vehicles 16030 and 16040. In this case, the CPM may include processing time information from the time when the V2I message was received to the time when the CPM message is transmitted. In the present embodiment, a case where the surrounding vehicles 16030 and 16040 transmit the CPMs is assumed, but the present disclosure is not limited thereto. The surrounding vehicles may transmit CAMs, and the CPMs may identically include the processing time information.

When receiving two or more processing times from the surrounding vehicles 16030 and 16040, the ego vehicle 16020 measures a distance from the vehicle that transmitted the CAM by using a sensor mounted on the vehicle. Furthermore, the ego vehicle 16020 calculates a relative distance (or position) of an RSU by using the processing times received from the surrounding vehicles 16030 and 16040 and distance times measured when the CAMs were received. Thereafter, the ego vehicle 16020 may calculate (or estimate) its absolute position by using an absolute position value of the RSU. The ego vehicle 16020 may transmit the calculated position information to the surrounding vehicles.

FIG. 17 is a diagram for describing a form in which a V2I message is transmitted according to an embodiment of the present disclosure.

Referring to FIG. 17, an RSU may transmit a V2I message in a low period (e.g., 1 Hz). In this case, prior to a specific message, the positioning RSU data frame described with reference to FIG. 12 may be inserted, and a positioning flag may be set as on. The RSU may transmit the V2I message including a positioning flag set as on in a preset specific period. For example, the aforementioned specific period may be 10 seconds as illustrated in FIG. 17. Furthermore, a repeated positioning flag may have a different sequence every period.

In an embodiment, when receiving a V2I message including a positioning flag, a vehicle that provides a CA service or a CP service may measure the time when the V2I message was received as described above, and may then transmit its message including obtained position information. A transceiver that performs a one-RSU positioning operation (i.e., an operation of obtaining position information using one RUS) may identify its position while exchanging messages in a given period.

FIG. 18 is a flowchart illustrating a method of generating a V2I message according to an embodiment of the present disclosure.

Referring to FIG. 18, when a V2I service system starts, an RSU initializes the system and updates service content for generating a V2I message (S18010, S18020).

When a positioning mode is turned off (i.e., off), the RSU may generate the same V2I message as the existing message (S18070), may generate a packet through a networks & transport layer and an access layer, and may transmit the packet to surrounding vehicles (S18080, S18090).

When the positioning mode is turned on, the RSU generates DF_PositioningRSU (S18040). The RSU initializes a counter and updates a sequence (S18050, S18060). The RSU may generate the DF_PositioningRSU (S18070), may generate a packet through the networks & transport layer and the access layer, and may transmit the packet to the surrounding vehicles (S18080, S18090).

FIG. 19 is a flowchart illustrating a method of generating a CAM message according to an embodiment of the present disclosure.

Referring to FIG. 19, when a CA service system starts, a V2X vehicle initializes the system and receives a positioning flag (PositioningFlag) from an RSU (S19010, S19020). When a positioning flag is on, before transmitting a CAM, the V2X vehicle obtains the time when a V2I message was received (S19040). Furthermore, the vehicle calculates the aforementioned processing time based on the time (S19050).

In an embodiment, a V2X vehicle to which a current vehicle provides a CP service may measure the state and distance of an object detected through a sensor, while calculating the processing time.

The V2X vehicle generates a positioning CAM data frame based on the processing time generated in step S19050, and generates a CAM message including the positioning CAM data frame (S19060, S19070). The V2X vehicle may generate a packet through a networks & transport layer and an access layer, may generate a packet, and may transmit the packet to surrounding vehicles (S19080, S19090).

FIG. 20 is a flowchart illustrating a method of obtaining position information according to an embodiment of the present disclosure.

Referring to FIG. 20, when a system starts, a V2X vehicle initializes an on board unit (OBU) system and waits to receive a V2X message (S20010, S20020). When receiving the V2I message (S20030), the V2X vehicle decodes the V2X message (S20040). If the V2I message is a V2I message transmitted by an RSU, the V2X vehicle checks a positioning flag (PositioningFlag) (S20060). When the positioning flag is on, the V2X vehicle measures and stores a V2I reception time (S20070). Furthermore, the V2X vehicle obtains an absolute position of the RSU from the V2I message (S20080). The V2X vehicle delivers, to the transmitter side, information obtained in a previous step so that a positioning CAM data frame can be generated (S20090). The V2X vehicle calculates the position of the V2X vehicle by using the time when the V2I message was received and the RSU position value (S20160).

When receiving a CPS message (S20100), the V2X vehicle checks whether a CorrectedPosition value is included in the CPS message (S20110). If the CorrectedPosition value is included in the CPS message, the V2X vehicle may immediately recognize its absolute position based on the CorrectedPosition value (S20160). If the CorrectedPosition value is not included in the CPS message, the V2X vehicle measures a CPM reception time, obtains values of a processing time field and a propagation time field included in a PositioningCPS data frame within the CPM (S20130), and stores related parameters (S20140). When receiving two or more pieces of CPS information, the V2X vehicle may calculate a relative position of the RSU by applying the methods described with reference to FIGS. 5 to 11 (S20150), and may estimate an actual position of the V2X vehicle by comparing the relative position of the RSU and the absolute position value of the RSU (S20160).

In an embodiment, the V2X vehicle may perform the same steps S20100 to S20160 although it receives a CAM message.

FIG. 21 illustrates a configuration of a V2X communication apparatus according to an embodiment of the present disclosure. As described above, the V2X communication apparatus may also be denoted as a V2X communication device, a V2X apparatus, etc.

In FIG. 21, the V2X communication apparatus 21000 may include a communication unit 21010, a processor 21020, and a memory 21030.

The communication unit 21010 is connected to the processor 21020, and may transmit and receive radio signals. The communication unit 21010 may up-convert, into a transmission and reception band, data received from the processor 21020, and may transmit a signal or may down-convert a received signal. The communication unit 21010 may implement at least one operation among a physical layer or an access layer.

The communication unit 21010 may include a plurality of sub-RF units for communication according to a plurality of communication protocols. As an embodiment, the communication unit 21010 may perform data communication based on ITS-G5 wireless communication technologies based on the physical transmission technologies of dedicated short range communication (DSRC), IEEE 802.11 and/or 802.11p standards, and IEEE 802.11 and/or 802.11p standards, 2G/3G/4G(LTE)/5G wireless cellular communication technologies including satellites/wideband wireless mobile communication, wideband terrestrial digital broadcasting technologies such as DVB-T/T2/ATSC, a GPS technology, an IEEE 1609 WAVE technology, etc. The communication unit 21010 may include a plurality of transceivers that implement each communication technology.

The processor 21020 is connected to the RF units 21010 and may implement operations of layers of the V2X communication apparatus. The processor 21020 may be configured to perform operations according to various embodiments of the present disclosure according to the aforementioned drawings and description. Furthermore, at least one of a module, data, a program, or software that implements operations of the V2X communication apparatus 21000 according to the aforementioned various embodiments of the present disclosure may be stored in the memory 21030 and executed by the processor 21020.

The memory 21030 is connected to the processor 21020, and stores various types of information for driving the processor 21020. The memory 21030 may be included within the processor 21020 or installed outside the processor 21020 and may be connected to the processor 21020 by known means.

The processor 21020 of the V2X communication apparatus 21000 may perform the generation and transmission of an IPM described in the present disclosure. A method of performing, by the V2X communication apparatus 21000, V2X communication is described below.

FIG. 22 is a flowchart illustrating a method of obtaining, by a V2X communication apparatus, position information according to an embodiment of the present disclosure.

Referring to FIG. 22, the V2X communication apparatus (or a V2X vehicle) receives, from a road side unit (RSU), a V2I message including position information of the RSU (S22010).

The V2X communication apparatus receives, from a first surrounding vehicle and a second surrounding vehicle, the V2X message including reception time information related to the time when the V2I message was received (S22020). For example, the V2X message may be a CAM or a CPM.

The V2X communication apparatus calculates a relative position (or predicted position) of the RSU based on a current vehicle, based on the reception time information and the time when the current vehicle receives the V2I message (S22030).

The V2X communication apparatus obtains a position (i.e., an absolute position or coordinates) of the current vehicle based on the relative position of the RSU and the position information of the RSU (S22040).

As an embodiment, the position information of the RSU may include coordinates of the RSU. The position of the current vehicle may be obtained by subtracting the relative position of the RSU from the coordinates of the RSU. For example, in this case, Equation 1 may be applied.

As an embodiment, the relative position of the RSU may be calculated using a first difference value between the time when the first surrounding vehicle received the V2I message and the time when the current vehicle received the V2I message, and a second difference value between the time when the second surrounding vehicle received the V2I message and the time when the current vehicle received the V2I message. In this case, the methods described with reference to FIGS. 6 to 8, 11 and Equations 4, 7 to 9 may be applied.

As an embodiment, the reception time information may include time interval (or processing time) information from the time when the first surrounding vehicle or the second surrounding vehicle received the V2I message to the time when the first surrounding vehicle or the second surrounding vehicle transmits the V2X message. For example, the method described with reference to FIG. 11 may be applied.

As an embodiment, the aforementioned position information of the method may further include a step of generating a cooperative awareness (CA) message or a collective perception (CP) message including the obtained position of the current vehicle. In other words, the V2X communication apparatus may transmit accurate position information to the surrounding vehicles through the CAM or CPM including the position information of the vehicle obtained by applying the method proposed in the present disclosure.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

MODE FOR INVENTION

Those skilled in the art will understand that the disclosure may be changed and modified in various ways without departing from the spirit or range of the disclosure. Accordingly, the disclosure is intended to include all the changes and modifications provided by the appended claims and equivalents thereof.

In this disclosure, both the apparatus and the method have been described, and the descriptions of both the apparatus and method may be complementarily applied.

Various embodiments have been described in the best form for implementing the disclosure.

INDUSTRIAL APPLICABILITY

The disclosure is used in a series of V2X communication fields.

Those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A method of obtaining position information of a current vehicle based on V2X communication, comprising:
   receiving, from a road side unit (RSU), a V2I message including absolute position information of the RSU;
   receiving, from each of a first surrounding vehicle and a second surrounding vehicle, a V2X message including reception time information related to time when the V2I message is received;
   obtaining, by the current vehicle, a relative position of each of the first surrounding vehicle and the second surrounding vehicle to the current vehicle by using a sensor mounted on the current vehicle;
   calculating a relative position of the RSU to the current vehicle, based on the reception time information time when the current vehicle receives the V2I message, and the relative position of each of the first surrounding vehicle and the second surrounding vehicle to the current vehicle; and obtaining an absolute position of the current vehicle based on the relative position of the RSU to the current vehicle and the absolute position information of the RSU.

2. The method of claim 1, wherein the absolute position information of the RSU includes coordinates of the RSU, and
wherein the position of the current vehicle is obtained by subtracting the relative position of the RSU to the current vehicle from the coordinates of the RSU.

3. The method of claim 1, wherein the relative position of the RSU to the current vehicle is calculated using a first difference value between time when the first surrounding vehicle receives the V2I message and the time when the current vehicle receives the V2I message and a second difference value between time when the second surrounding vehicle receives the V2I message and the time when the current vehicle receives the V2I message.

4. The method of claim 1, wherein the reception time information includes time interval information from time when the first surrounding vehicle or the second surrounding vehicle receives the V2I message to time when the first surrounding vehicle or the second surrounding vehicle transmits the V2X message.

5. The method of claim 1, further comprising:
generating a cooperative awareness (CA) message or a collective perception (CP) message including the obtained position of the current vehicle.

6. A V2X communication apparatus of a vehicle, comprising:
a memory storing data;
a communication unit transmitting and receiving radio signals including a V2I message; and
a processor configured to control the memory and the communication unit,
wherein the processor is configured to:
receive, from a road side unit (RSU), a V2I message including absolute position information of the RSU,
receive, from each of a first surrounding vehicle and a second surrounding vehicle, a V2X message including reception time information related to time when the V2I message is received,
obtain, by the current vehicle, a relative position of each of the first surrounding vehicle and the second surrounding vehicle to the current vehicle by using a sensor mounted on the current vehicle,
calculate a relative position of the RSU to the current vehicle, based on the reception time information, time when the current vehicle receives the V2I message, and the relative position of each of the first surrounding vehicle and the second surrounding vehicle to the current vehicle, and
obtain an absolute position of the current vehicle based on the relative position of the RSU to the current vehicle and the absolute position information of the RSU.

7. The V2X communication apparatus of claim 6, wherein the absolute position information of the RSU includes coordinates of the RSU, and
wherein the position of the current vehicle is obtained by subtracting the relative position of the RSU to the current vehicle from the coordinates of the RSU.

8. The V2X communication apparatus of claim 6, wherein the relative position of the RSU to the current vehicle is calculated using a first difference value between time when the first surrounding vehicle receives the V2I message and the time when the current vehicle receives the V2I message and a second difference value between time when the second surrounding vehicle receives the V2I message and the time when the current vehicle receives the V2I message.

9. The V2X communication apparatus of claim 6, wherein the reception time information includes time interval information from time when the first surrounding vehicle or the second surrounding vehicle receives the V2I message to time when the first surrounding vehicle or the second surrounding vehicle transmits the V2X message.

10. The V2X communication apparatus of claim 6, wherein the processor is configured to generate a cooperative awareness (CA) message or a collective perception (CP) message including the obtained position of the current vehicle.

* * * * *